United States Patent [19]

Pichler et al.

[11] 4,413,869

[45] Nov. 8, 1983

[54] HEAT RESISTANT CABINET AND METHOD OF MANUFACTURE

[75] Inventors: Günther Pichler, Germersheim; Friedrich Rothhaas; Hans Hock, both of Bellheim, all of Fed. Rep. of Germany

[73] Assignee: Sistemco N.V., Willemstad, Netherlands Antilles

[21] Appl. No.: 247,782

[22] Filed: Mar. 26, 1981

Related U.S. Application Data

[63] Continuation-in-part of Ser. No. 244,863, Mar. 18, 1981, abandoned.

[30] Foreign Application Priority Data

Mar. 18, 1980 [CH] Switzerland ........................ 2114/80

[51] Int. Cl.³ ........................ A47B 81/00; C09K 5/06; C09K 3/28; E05G 1/12

[52] U.S. Cl. ...................................... 312/236; 252/70; 312/214; 428/920

[58] Field of Search .................. 312/236, 214; 252/62, 252/70; 165/104.21; 428/920

[56] References Cited

U.S. PATENT DOCUMENTS

| | | | |
|---|---|---|---|
| 3,559,594 | 2/1971 | Miller | 109/84 |
| 3,762,787 | 10/1973 | Grubb | 312/214 |
| 4,259,401 | 3/1981 | Chahroudi | 252/62 |
| 4,277,357 | 7/1981 | Boardman | 252/70 |
| 4,288,338 | 9/1981 | Phillips | 252/70 |

FOREIGN PATENT DOCUMENTS

| | | | |
|---|---|---|---|
| 2617601 | 11/1977 | Fed. Rep. of Germany | 252/62 |
| 351951 | 6/1931 | United Kingdom . | |
| 488947 | 7/1938 | United Kingdom . | |
| 628020 | 8/1949 | United Kingdom . | |
| 1298674 | 12/1972 | United Kingdom . | |
| 1365741 | 9/1974 | United Kingdom | 312/236 |
| 1500046 | 2/1978 | United Kingdom | 312/236 |
| 1543336 | 4/1979 | United Kingdom . | |
| 1561755 | 2/1980 | United Kingdom . | |
| WO82/00040 | 1/1982 | PCT Int'l Appl. | 252/62 |

*Primary Examiner*—Dennis L. Albrecht
*Attorney, Agent, or Firm*—Frishauf, Holtz, Goodman & Woodward

[57] ABSTRACT

A heat resistant cabinet having at least one protected compartment for storing temperature-sensitive articles. The compartment is surrounded by a heat absorbing layer and may also be surrounded by a heat barrier layer. The heat absorbing layer is a solid mixture of a heat absorbing material which becomes liquid under the influence of excessive heat and also contains an additional material which binds said liquid heat absorbing material to form a doughy or solid mass. The additional material is a water-absorbing inorganic material such as plaster of Paris, caustic lime, or cement. The heat absorbing material is a material such as sodium acetate trihydrate or sodium metasilicate.

21 Claims, 4 Drawing Figures

HEAT RESISTANT CABINET AND METHOD OF MANUFACTURE

This application is a continuation-in-part application of Ser. No. 244,863, filed Mar. 18, 1981, now abandoned.

The invention refers to a heat resistant cabinet with at least one compartment for storing temperature-sensitive articles, such as magnetic tapes, floppy discs and the like, the compartment being surrounded by a heat barrier layer and/or a mixture of a heat absorbing material having a large heat of fusion and a further material.

BACKGROUND OF THE INVENTION

There exist cabinets with an external fire resistant housing comprising one or more layers of fire resistant material such as gypsum, concrete and the like. These layers form a heat barrier. The degree of protection depends on the thickness, the kind and amount of the materials used. In addition to these physical facts concerning the walls of the cabinet often other factors are also of importance. If for example magnetic tapes, floppy discs or microfilms must be stored, their sensitivity to moisture or their inflammability must be taken into consideration.

In the U.S. Pat. No. 3,559,594 a cabinet with heat insulated walls is described in which a further cabinet is provided which has walls with a filling of a heat absorbing material, e.g. sodium acetate trihydrate which melts at approximately 58° C. and absorbs large amounts of heat. Sodium metasilicate is also of advantage (German published application No. 24 13 644). To keep as much as possible heat from entering the interior of the cabinet, it is necessary to avoid empty spaces in the filling. In the cited U.S. Pat. No. 3,559,594 it is taught to fill the spaces completely by casting liquid sodium acetate trihydrate. The casting has the disadvantages that it does not avoid hollow spaces in the form of enclosed air bubbles. Further, the casting is a manufacturing method requiring much skill and relatively long cooling times. There is also always the danger of spilling of hot filling material. In cooling there is shrinkage of the material which may also lead to undesirable hollow spaces.

The German Pat. No. 22 45 453 teaches to provide in the interior of a cabinet with heat resistant walls a container having walls formed by cells filled with sodium acetate trihydrate in particulate form. The manufacturing of this cell must not take place by casting hot material, but can take place by filling-in a certain amount of particulate material at room temperature Because, when the cabinet is transported, the particulate material can settle somewhat, a relatively large hollow space is obtained at the top. In the case of a fire, melting of the particulate material may increase this hollow space. In order to avoid that heat may enter into the container, heat conducting elements are provided in the hollow space. These heat conducting elements extend into the heat absorbing material to transfer the heat into this material. This prior art heat resistant cabinet has not only the disadvantage that it is relatively complicated and expensive, but in the case of a fire there exists also the danger of leaking of liquid sodium acetate trihydrate. The leaking liquid may eventually damage the stored articles. If it is desired to prevent leakage of liquid material, the cell must be manufactured watertight. However, this is an additional expense.

German Pat. No. 22 45 453 further reports on tests with different mixtures comprising different amounts of further materials, for example particulate vermiculite, particulate perliteor or fine saw-dust. These further materials have the purpose to alter the heat regulating effects of the sodium acetate trihydrate. U.S. Pat. No. 3,762,787 discloses the use of sodium acetate trihydrate as a heat absorbing substance and further discloses the addition thereto of varying amounts of heat resistant materials, such as particulate vermiculte, particulate perlite or fine saw-dust for variation of the heat regulation characteristics, and in the case of the addition of insulative materials such as vermiculate, to provide a heat barrier in the same physical location as the heat sink.

THE INVENTION

It is an object of the present invention to provide a heat resistant cabinet which provides better heat protection of the stored goods and prevents leaking of molten heat absorbent material in a simple manner. The cabinet has at least one compartment for storage which is protected against heat damage. The compartment is surrounded by a layer of solid heat absorbing material which has a large heat of fusion and has admixed therewith a further material which has the property, when heat absorbing material becomes liquid during fusion, to form, together with the fused heat absorbing material, a doughy mass or a solid mass. The said further material is a water absorbing inorganic material such as caustic lime, cement, and preferably is plaster of Paris.

This construction has the advantage that it is not necessary to contain the admixture of the heat absorbing material and the further material which comprise the heat absorbing layer, in an liquid-tight container in order to prevent leakage of liquid in case of fire. It is possible to use a container which is not liquid-tight, such as a container manufactured by spot-welding which is more economic.

Compared with prior art cabinets, substantially higher heat protection is obtained which may be explained by the fact that when heated during a fire, the sand mixture does not become liquid and therefore does not collapse, but remains practically solid in its original location. It has also been found that the transformation of the mixture takes place slowly from the exterior toward the interior, whereby the transformed part of the mixture having no further capacity to absorb heat in the region of the melting point still functions as a heat barrier. In contrast to this in prior art cabinets wherein the heat absorbing material becomes liquid, convection currents take place in the liquid transporting heat from the hot exterior wall to the cold interior wall.

Said further material of the heat resistant cabinet preferably has the property to bind the heat absorbing material chemically when it becomes liquid. Said further material is a water absorbing inorganic material. Such materials are not combustible and generally cheap. Of particular advantage are burned plaster of Paris, e.g. gypsum as normally used in construction and for manufacturing heat resistant cabinets. The latter fact makes the use of plaster of Paris particularly advantageous, because in this case no further materials must be kept in store for manufacturing the cabinet. However, also the use of caustic lime or cement or similar material is possible, but generally not as advantageous, because of the problem of additional inventory.

Sodium-metasilicate or sodium acetate trihydrate may be used as heat absorbing material. Sodium acetate trihydrate has a somewhat higher melting point (58° C.) than sodium-6-metasilicate or sodium-9-metasilicate. The mixture is preferably in particulate form, but may also be in form of a powder. A mixture in particulate form is generally easier to handle in manufacturing than a mixture in powder form. However, a mixture in the form of powder generally permits a higher packing density. Of particular advantage is a mixture in which the heat absorbing material is in particulate form and the further material is in form of powder. If plaster of Paris is used in form of powder the inventory problem is simplified, because plaster of Paris is anyway used for manufacturing of heat resistant cabinet, and it is delivered as powdery material. A mixture of particulate and powdery material provides also a high packing density, because the spaces between the particles are filled by powder. Preferably, the mixture consists of about 90 percent by volume of heat absorbing material and about 10 percent by volume of said further material, normally plaster of paris. The surprisingly high binding effect of plaster of Paris has the advantage that the mixture has a very high content of heat absorbing material. In spite of this the mixture has in case of a fire in addition to the effect of absorbing heat the effect of a heat barrier, because it does not become liquid and remains in place. The heat barrier effect contributes to the heat protecting effect of the layer consisting of the new mixture.

The invention also concerns a method for manufacturing a cabinet. This method is characterized in that the filling in of the mixture takes place under vibration. During the filling operation the cabinet or cabinet part can be vibrated to obtain a dense packing. Embodiments of the invention will now be described with reference to the drawing.

DETAILED DESCRIPTION OF THE INVENTION

Figure 1:
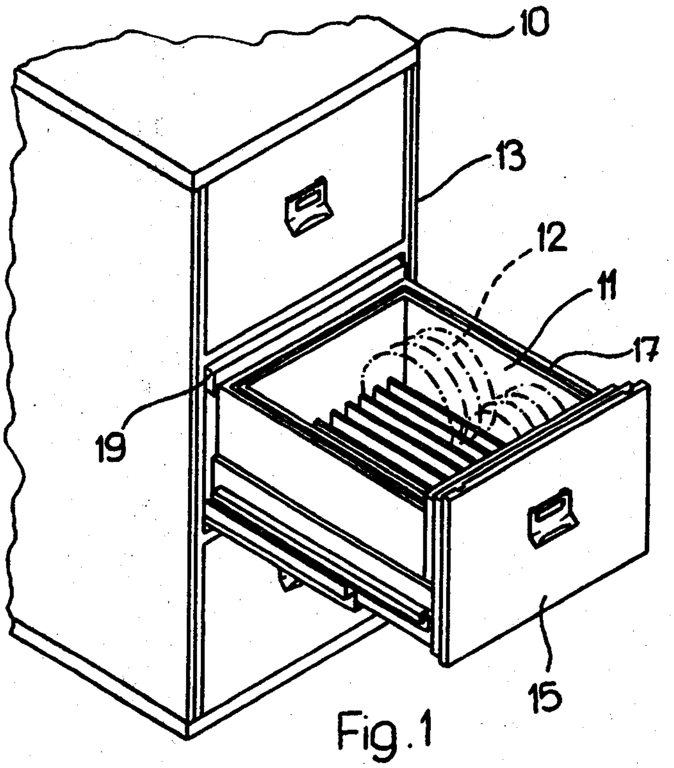
FIG. 1 shows a cabinet known per se having a housing with insulating gypsum walls and a container located in a drawer. The walls of the container contain a heat absorbing material.

In FIG. 1 a cabinet 10 known per se is shown. The housing 13 has an insulation of a heat barrier material, e.g. gypsum. The drawer 15 is used for storing heat sensitive articles, e.g. magnetic tapes 12. The compartment room 11 is formed by a container 17 having walls of a heat absorbing material having a large heat of fusion, e.g. sodium acetate trihydrate. Also the cover 19 of the container 17, which is lifted by a mechanism on pulling out the drawer 15 contains a heat absorbing material having a large heat of fusion. Further details on such a cabinet are found in the German Pat. No. 22 45 453.

Cabinets of the kind shown in FIG. 1 are known in different forms. Generally the space containing the articles to be stored is always surrounded by a layer comprising a heat absorbing material having a high heat of fusion or at least a mixture of a heat absorbing material having a high heat of fusion and a further material. Generally still a further layer of a heat barrier material is provided.

Figure 2:
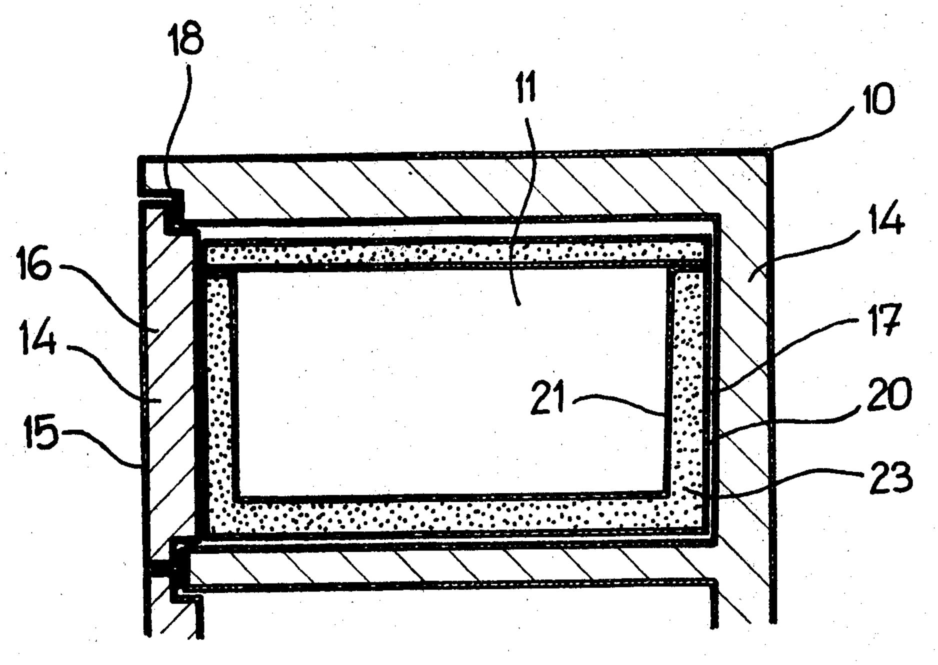
FIG. 2 shows a cross section through a cabinet in FIG. 1.

In FIG. 2 a cross section through an embodiment of a heat resistant cabinet according to the invention is schematically shown. The cabinet housing 10 of sheet metal contains a gypsum insulation 14. The same is true for the front side 16 of the drawer 15. In known manner a seal 18 for sealing the drawer is provided. In the interior of the drawer 15 is a space 11 for storing temperature-sensitive articles. This space is formed by a container 17 comprising an outer wall 20 and an inner wall 21 of sheet metal or another suitable material. The space between the wall 20, 21 is provided with a mixture 23 of a heat absorbing material having a high heat of fusion and a further material having the property to bind the heat absorbing material when it becomes liquid in absorbing heat and to form with the heat absorbing material a doughy or solid mass.

The mixture 23 consists for example of 90 percent by volume of sodium metasilicate-9-hydrate and 10 percent by volume of plaster of paris. The sodium metasilicate-9-hydrate is normally furnished in particulate form whereas the plaster of Paris is normally in form of powder. However, it is possible to use instead of gypsum another inorganic material which binds the sodium metasilicate-9-hydrate e.g. chemically when it becomes liquid in absorbing heat. For example instead of plaster of Paris also caustic lime or cement may be used as they are also known as water absorbing binding materials in the construction of housings. Most sodium metasilicates have a favourable melting point being arround 50° C. Of particular use is sodium-6-metasilicate and sodium-9-metasilicate, but also sodium acetate trihydrate is an advantageous heat absorbing material. In manufacturing of the cabinet it is of advantage when the filling of the mixture takes place under vibration. In this way a dense packing is obtained.

Figure 3:
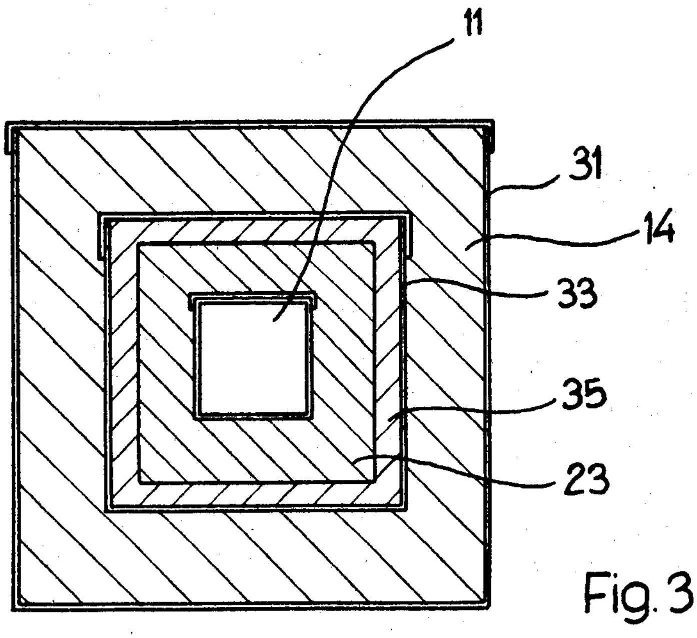
FIG. 3 shows the design of a test sample.
Figure 4:
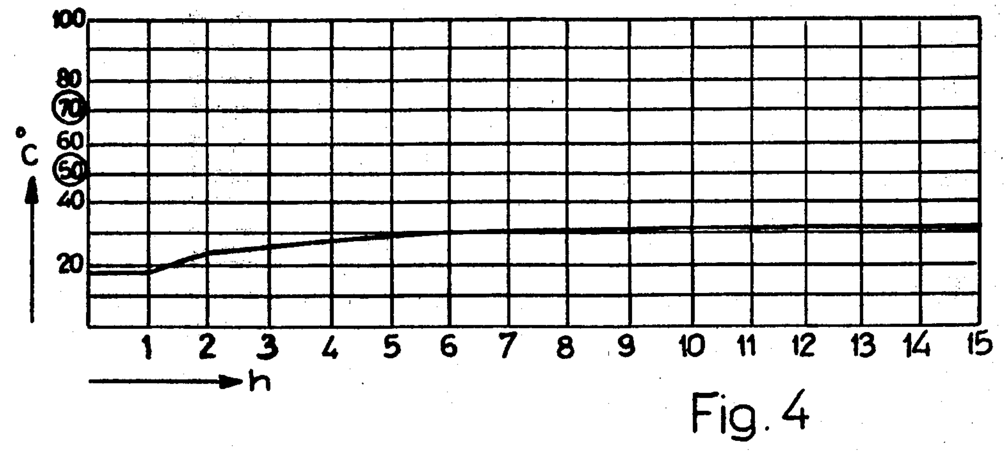
FIG. 4 shows the test results from a fire test at a temperature of 900° C. in the firing room.

An example of a test with a test body will now be described. A test body shown schematically in FIG. 3 has been tested in a fire room at a temperature of 900° C. During 85 minutes the body has been directly covered by the flame, whereupon the body has been taken from the furnace. The body schematically shown in FIG. 3 comprises an exterior steel cover 31 and an interior steel cover 33, between which there is a layer 14 of porous gypsum having a thickness of 70 mm. Then follows a mineral fiber barrier plate 35 which is available under the designation Isover-plate SP/TR 180. This barrier plate 35 has a thickness of 20 mm. The layer 23 comprising a mixture of 90 percent by volume of sodium metasilicate-9-hydrate and 10 percent by volume of plaster of paris has been 40 mm thick. As the curve of FIG. 4 shows also after 15 hours no increase of the interior temperature above 32° C. has been detected.

The admixture of the heat absorbing material with the said further material, also referred to as the "additional" or "binder" material, includes sufficient of said further material to bind the heat absorbing material when it fuses (becomes liquid) under the influence of heat to form the doughy or solid mass. This generally requires at least about 10% by volume of said additional material. Preferably, the admixture contains between about 60% and 90% by volume of said solid heat absorbing material and between 10% and 40% of said solid additional material. More preferably, the admixture contains between about 80% and 85% of said solid heat absorbing material and between about 15% and 20% of said solid additional material. The most preferred compositions contain about 80% by volume of said absorbing material and about 20% by volume of said additional or binding material.

Various changes and modifications may be made, and features described in connection with any one of the embodiments may be used with any of the others, within the scope of the inventive concept.

We claim:

1. A heat resistant cabinet having at least one compartment for storing temperature-sensitive articles, said compartment being surrounded by a heat absorbing layer consisting essentially of a particulate or powdery mixture of a heat absorbing material having a large heat of fusion and at least about 10% by volume of a binder material, said binder material being a water absorbing inorganic material selected from the group consisting of plaster of paris, caustic lime, and cement which when the heat absorbing material becomes liquid, binds said liquid heat absorbing material to form therewith a doughy mass or a solid mass.

2. Cabinet according to claim 1, wherein said binder material has the property of chemically reacting with the hot liquid heat absorbing material to form therewith said doughy mass or solid mass.

3. Cabinet according to claim 1, wherein said compartment is also surrounded by a heat barrier layer.

4. Cabinet according to claim 1, wherein said binder material is plaster of Paris.

5. Cabinet according to claim 1, wherein said binder material is caustic lime.

6. Cabinet according to claim 1, wherein said binder material is cement.

7. Cabinet according to claim 4 or 5 or 6, wherein said heat absorbing material is sodium metasilicate.

8. Cabinet according to claim 4 or 5 or 6, wherein said heat absorbing material is sodium-6-metasilicate.

9. Cabinet according to claim 4 or 5 or 6, wherein said heat absorbing material is sodium-9-metasilicate.

10. Cabinet according to claim 4 or 5 or 6, wherein said heat absorbing material is sodium acetate trihydrate.

11. Cabinet according to claim 1, wherein said heat absorbing material is in particulate form and said binder material is in the form of powder.

12. Cabinet according to claim 11, wherein said mixture consists essentially of about 80% by volume of said heat absorbing material and about 20% by volume of said binder material.

13. Cabinet according to claim 1, wherein said mixture is in particulate form.

14. Cabinet according to claim 1, wherein said mixture is in the form of powder materials.

15. A method of manufacturing a cabinet according to claim 1, wherein said heat absorbing layer is filled into the space in which it is positioned surrounding said compartment while vibratory motion is imparted to the walls surrounding said space and is thereby imparted to said mixture.

16. Cabinet according to claim 1, wherein said heat absorbing material having a large heat of fusion is in an amount between about 60% and 90% by volume and said binder material is in an amount of between about 10% and 40%.

17. Cabinet according to claim 2, wherein said heat absorbing material having a large heat of fusion is in an amount between about 75% and 85% by volume and said binder material is in an amount between about 15% and 25%, and wherein said heat absorbing material is selected from the group consisting of sodium metasilicate and sodium acetate trihydrate.

18. Cabinet according to claim 7, wherein said heat absorbing material having a large heat of fusion is in an amount between about 80% and 85% by volume and said binder material is in an amount between about 15% and 20%.

19. Cabinet according to claim 8, wherein said heat absorbing material having a large heat of fusion is in an amount between about 80% and 85% by volume and said binder material is in an amount between about 15% and 20%.

20. Cabinet according to claim 9, wherein said heat absorbing material having a large heat of fusion is in an amount between about 80% and 85% by volume and said binder material is in an amount between about 15% and 20%.

21. Cabinet according to claim 10, wherein said heat absorbing material having a large heat of fusion is in an amount between about 80% and 85% by volume and said binder material is in an amount between about 15% and 20%.

* * * * *